Figure 1:
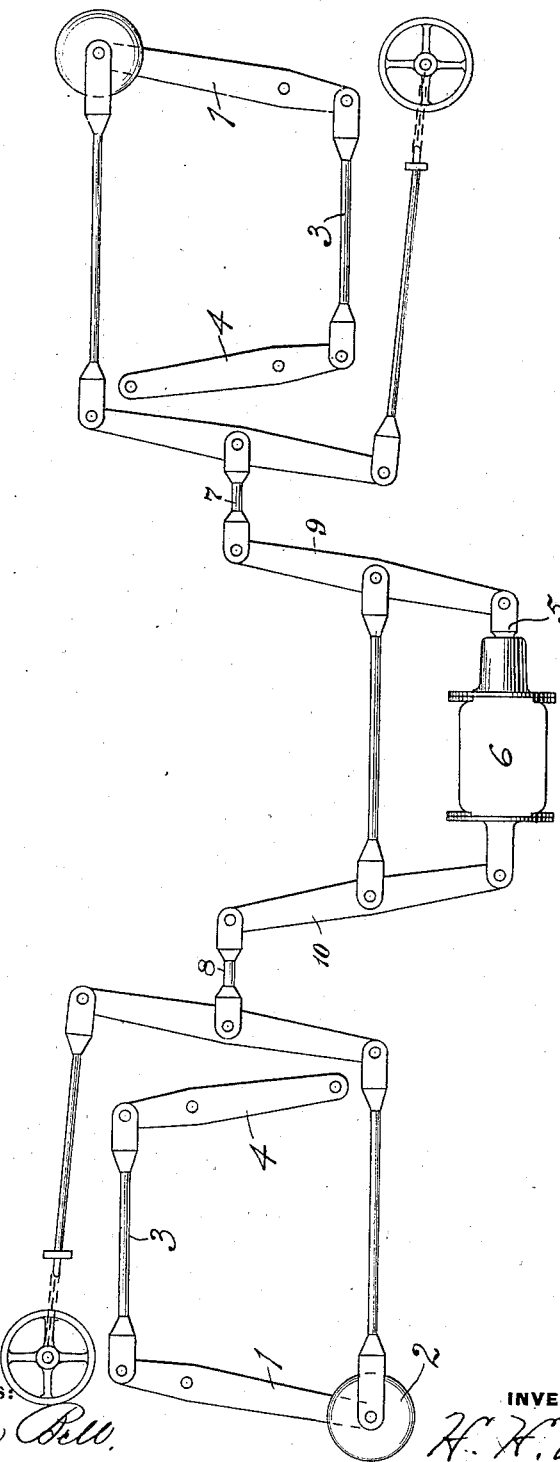

No. 656,382.

H. H. WESTINGHOUSE.
RAILWAY BRAKE.
(Application filed Nov. 1, 1898.)

(No Model.)

Patented Aug. 21, 1900.

7 Sheets—Sheet 1.

WITNESSES:
INVENTOR,
H. H. Westinghouse,
by T. J. Hogan,
Att'y.

No. 656,382. Patented Aug. 21, 1900.
H. H. WESTINGHOUSE.
RAILWAY BRAKE.
(Application filed Nov. 1, 1898.)
(No Model.) 7 Sheets—Sheet 2.

WITNESSES:
J. Howden Bell
W. S. Ruckman.

INVENTOR,
H. H. Westinghouse,
by T. J. Hogan, Att'y.

No. 656,382. Patented Aug. 21, 1900.
H. H. WESTINGHOUSE.
RAILWAY BRAKE.
(Application filed Nov. 1, 1898.)
(No Model.) 7 Sheets—Sheet 3.
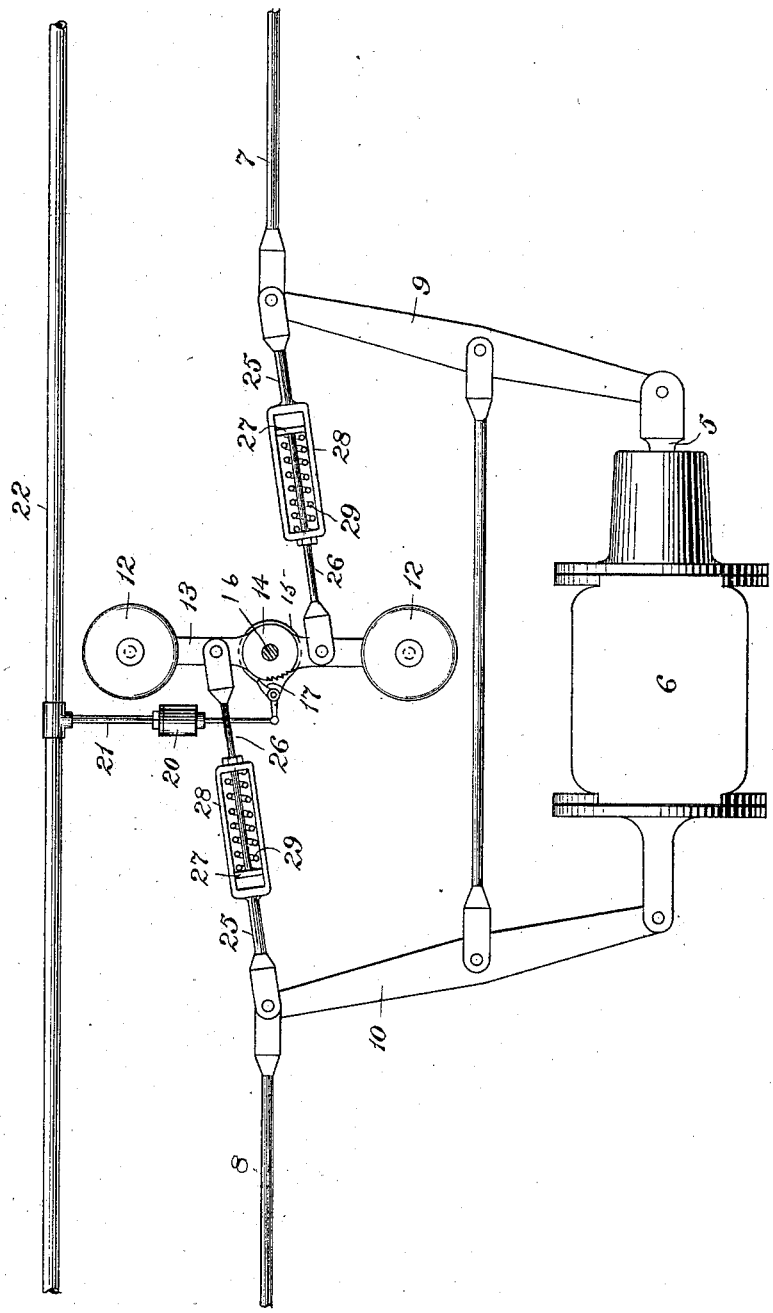

No. 656,382.　　　　　H. H. WESTINGHOUSE.　　Patented Aug. 21, 1900.
RAILWAY BRAKE.
(Application filed Nov. 1, 1898.)
(No Model.)　　　　　　　　　　　　　　　　7 Sheets—Sheet 4.

No. 656,382.  
H. H. WESTINGHOUSE.  
RAILWAY BRAKE.  
(Application filed Nov. 1, 1898.)

Patented Aug. 21, 1900.

(No Model.)

7 Sheets—Sheet 5.

WITNESSES:  
INVENTOR,  
H. H. Westinghouse,  
by T. J. Hogan,  
Att'y.

No. 656,382. Patented Aug. 21, 1900.
H. H. WESTINGHOUSE.
RAILWAY BRAKE.
(Application filed Nov. 1, 1898.)

(No Model.) 7 Sheets—Sheet 6.

No. 656,382. Patented Aug. 21, 1900.
H. H. WESTINGHOUSE.
RAILWAY BRAKE.
(Application filed Nov. 1, 1898.)
(No Model.)
7 Sheets—Sheet 7.
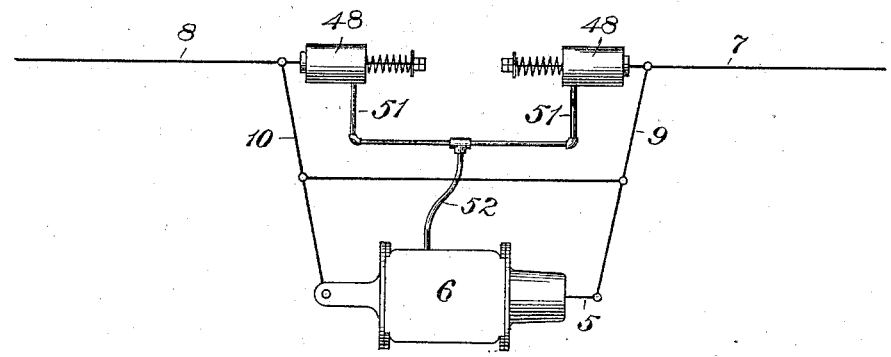
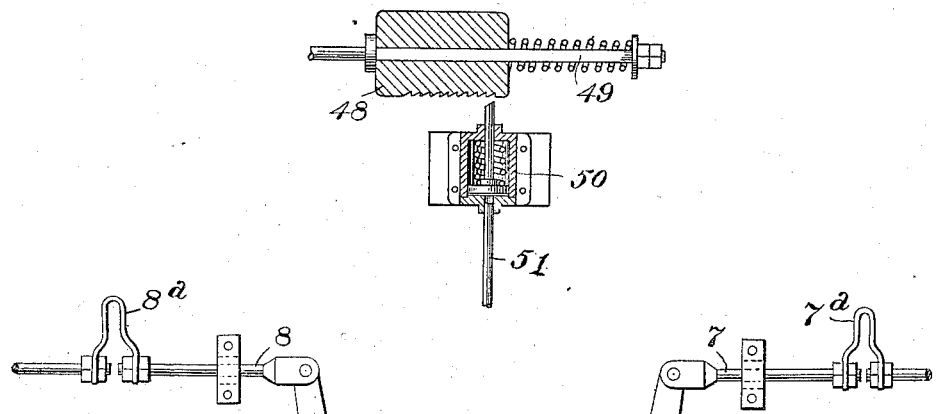

UNITED STATES PATENT OFFICE.

HENRY H. WESTINGHOUSE, OF PITTSBURG, PENNSYLVANIA.

RAILWAY-BRAKE.

SPECIFICATION forming part of Letters Patent No. 656,382, dated August 21, 1900.

Application filed November 1, 1898. Serial No. 695,236. (No model.)

*To all whom it may concern:*

Be it known that I, HENRY H. WESTINGHOUSE, a citizen of the United States, residing at Pittsburg, in the county of Allegheny and State of Pennsylvania, have invented or discovered a certain new and useful Improvement in Railway-Brakes, of which improvement the following is a specification.

The object of my invention is to provide an improvement in railway brake apparatus; and to this end my invention consists in means for augmenting the braking force of any of the ordinary or proposed forms of brake apparatus in which a brake-shoe or other friction device is applied by the movement of mechanism actuated by any form of motor; and my invention further consists in certain combinations and features of construction, all as hereinafter set forth.

My invention is adapted to be applied to almost any form of brake apparatus; but, as shown in the drawings, it is applied to an automatic air-brake apparatus in which the motor consists of a brake-cylinder and a piston. It is not limited in its application to an automatic system nor to a fluid-pressure brake system, as it may be employed in connection with a direct system, and the form of motor is not limited.

In accordance with my invention the effect of inertia is utilized to augment the pressure of the brake-shoes on the wheels to a degree above that which would be caused by the operation of the motor in an apparatus not embodying my improvement. In the practice of my invention I employ a weight or mass of matter additional to the necessary material forming the movable mechanism of the brake apparatus in such a manner that the momentum of the weight may act to supplement the operation of the motor, and thereby increase the force with which the shoes are pressed to the wheels.

Figure 3:
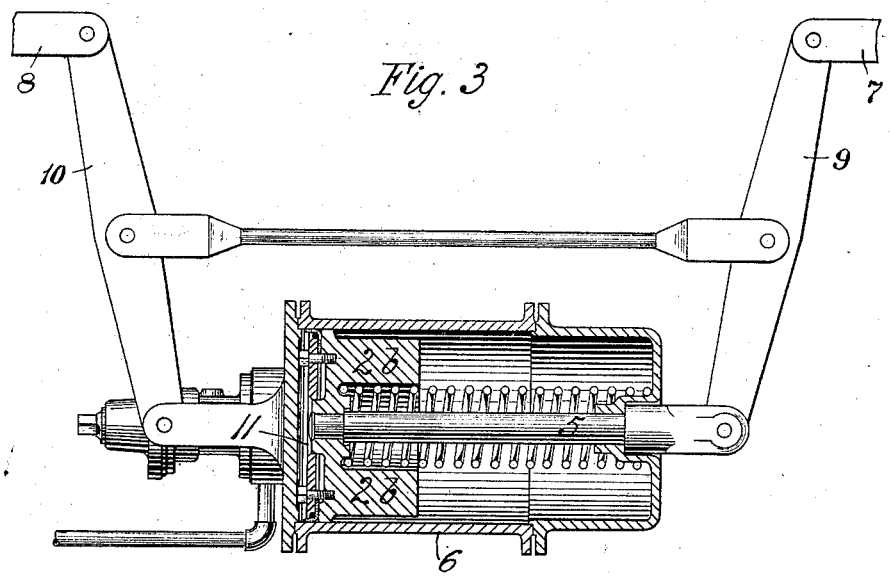
Figure 2:
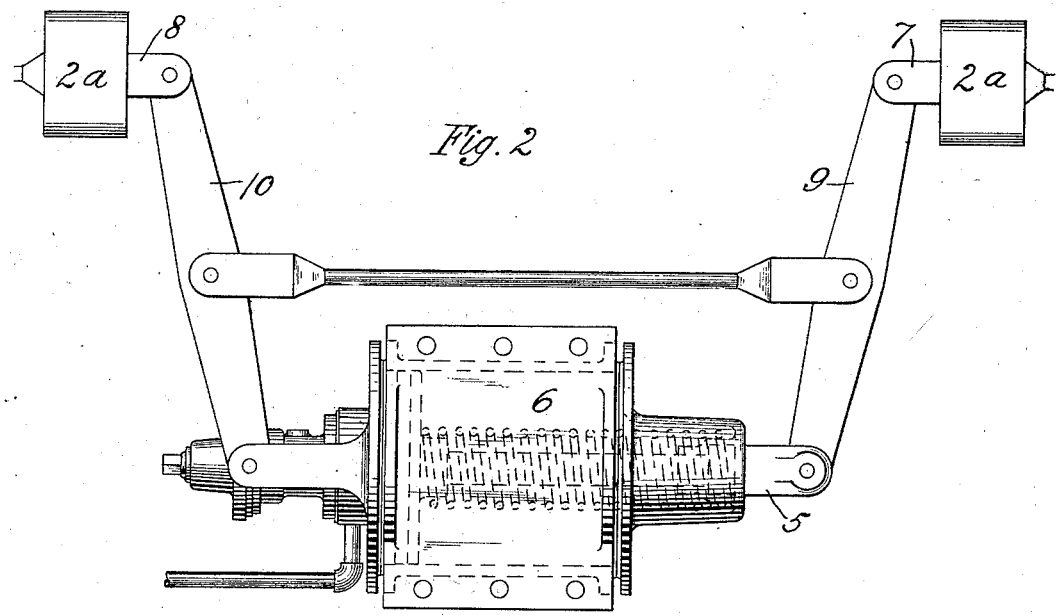
Figure 5:
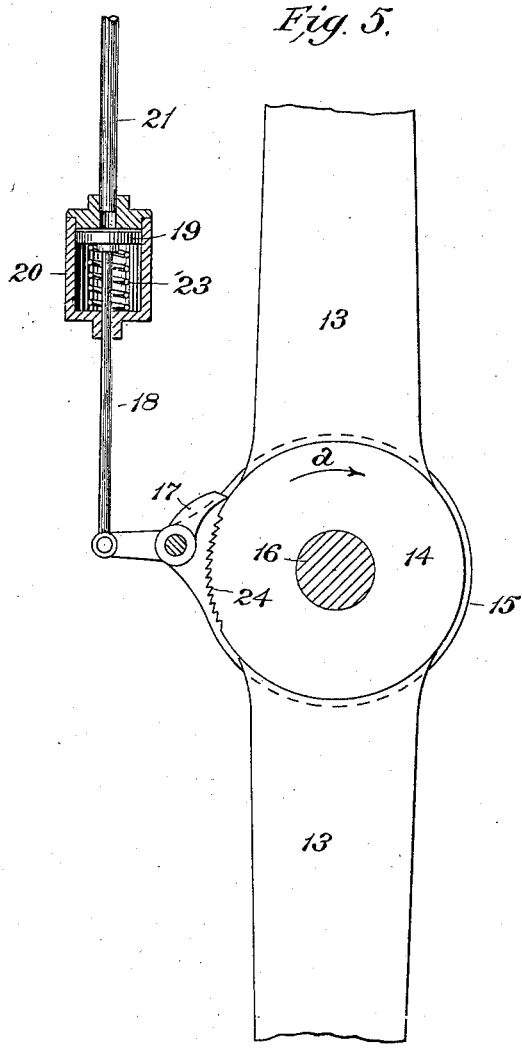
Figure 6:
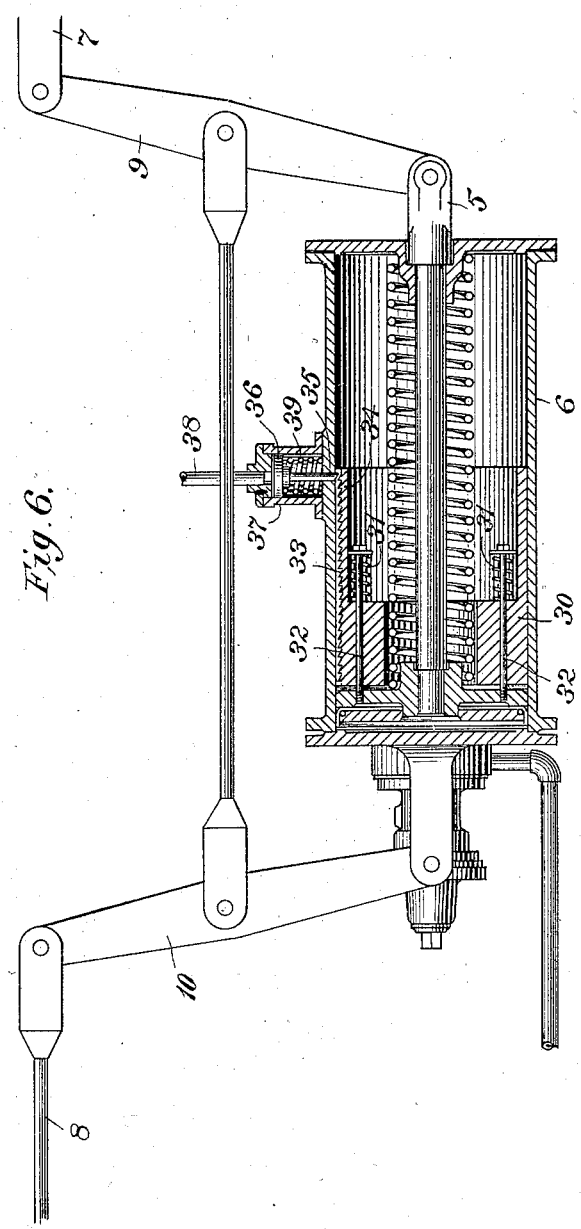
Figure 7:
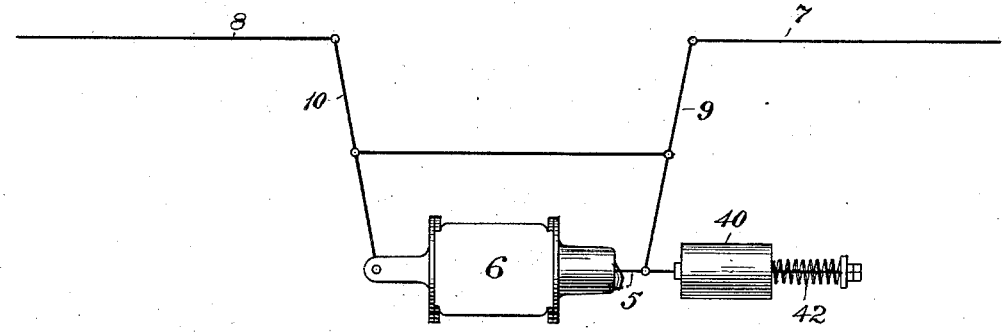
Figure 8:
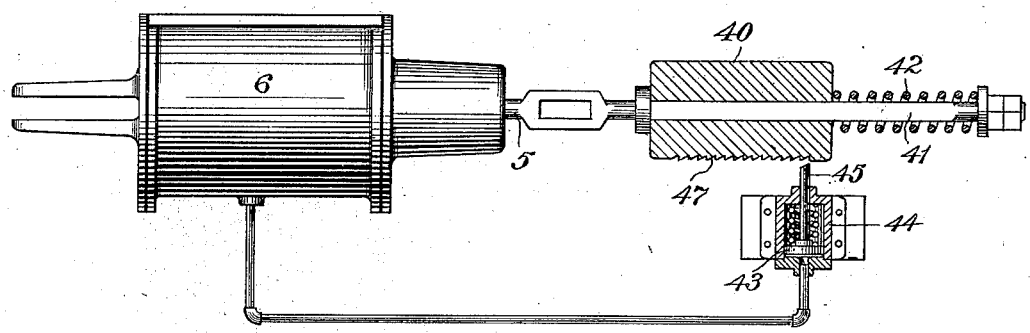

In the accompanying drawings, which illustrate applications of my invention, Figure 1 is a plan view of a brake mechanism embodying my invention. Fig. 2 is a plan view of a brake-cylinder and brake-cylinder levers and connections, showing a modification of my invention. Fig. 3 is a horizontal section through a brake-cylinder of an air-brake apparatus, showing another application of my invention; Fig. 4, a plan view of part of an air-brake apparatus, showing a modification of my invention, with means for locking and unlocking the parts by variations in train-pipe pressure; Fig. 5, a detail view of part of the mechanism shown in Fig. 4, but on a larger scale; Fig. 6, a view similar to that shown in Fig. 3, in which the momentum device is located within the brake-cylinder and is provided with means for locking it in position when the brakes are applied; Fig. 7, a plan view of a modification in which the momentum device is connected with the piston-rod of the brake-cylinder; Fig. 8, a view, on a larger scale, at right angles to that shown in Fig. 7; Fig. 9, a plan view; Fig. 10, a sectional view, on a larger scale, of a modification in which the momentum device is located on an extension of the pull-rod and the locking mechanism is adapted to be operated by pressure in the brake-cylinder; and Fig. 11 a view showing the pull-rods made in sections and provided with spring connections to give elasticity to the mechanism.

The inertia device or weight may be variously located and it is essential only, so far as the location is concerned, that it be so connected with the brake mechanism that the movement of the part on which it is located or to which it is connected shall move the weight in such a direction in applying the brakes that the inertia of the weight at the end of this movement will cause a pull or pressure on the mechanism in the same direction as that exerted by the motor, and thereby increase the pressure of the brake-shoe on the wheels. The increase in pressure will depend upon the rapidity with which the mechanism and the inertia device are moved in applying the brakes and also upon the mass of the inertia device. When the brakes are applied by a slow movement of the mechanism, the inertia of the weight and its effect in increasing the pressure will be correspondingly small, and in such applications there will usually not be any necessity for an increase in pressure such as that effected by the inertia device; but when the brakes are applied with any degree of suddenness the effect of the inertia device will be in proportion to the rapidity with which it is moved.

In Fig. 1 of the drawings the inertia device or weight 2 is shown secured to the live-lever 1 of that portion of the mechanism which is usually mounted on a car-truck. The live-lever 1 to which the weight 2 is secured is connected by a rod 3 with the dead-lever 4 and is also connected by an ordinary system of levers and rods with the piston-rod 5 of the brake-cylinder 6. The brake-shoes, which are not shown in the drawings, may be connected with the levers 1 and 4 in any desired manner, so as to be pressed against the wheels by the movement of the levers when actuated by the air in the brake-cylinder.

In Fig. 2 of the drawings the inertia device or weight $2^a$ is shown secured to pull-rods 7 and 8, which are directly connected to the brake-cylinder levers 9 and 10 and actuated by the movement of the piston-rod 5 in the cylinder 6, within which a piston of ordinary form is connected to the rod 5.

In Fig. 3 the inertia device or weight $2^b$ is located within the brake-cylinder and rigidly connected to or formed on the piston 11. With this construction the stroke of the piston and the length of the cylinder should be so proportioned that the weight when moved to the limit of its stroke will not come in contact with or be stopped by the cylinder-head or other fixed part.

In all of the modifications shown in the drawings the friction of the joints and of the piston in the brake-cylinder will act to resist any relaxation or return movement of the mechanism from the position assumed under the additional strain caused by the action of the inertia device. The inertia device will at the end of its movement tend to move all the parts of the mechanism beyond the positions into which they would be moved by the air in the brake-cylinder acting alone, and the extent of this additional movement will depend on the elasticity of the mechanism. It will be greatest when the parts have considerable length or are lightly constructed, so as to be somewhat flexible, and, if preferred, one or more spring connections may be employed to insure the elasticity of the mechanism—such, for example, as those shown in Fig. 11, in which the pull-rods are made in sections and the sections are connected together by the springs $7^a$ and $8^a$; but whether such elastic connections are or are not employed I prefer to so connect the weight with the brake mechanism that it will be capable of a more extended movement than the part of the ordinary brake mechanism with which it is connected and that it will act through an elastic connection to exert a pull or push on the mechanism.

In the construction shown in Figs. 4 and 5 of the drawings the inerta device comprises two weights 12, secured to arms 13, which are formed integral with a central part 14. The part 14 is supported by and pivoted on a fixed plate 15, which is secured to the bottom of the car. A pivot-pin 16 passes through the part 14 and may be passed through the part 15 or secured to it in any desired manner, so as to form a pivot about whose axis the inertia device may turn. The arms 13 of the inertia device are connected by a yielding connection with the pull-rods 7 and 8 in such a manner that when the pull-rods and the levers 9 and 10 are moved by the piston-rod 5 in applying the brakes the inertia device will be turned on its pivot by the thrust of the rods 25 and 26. Each of the rods 26 is provided with a head 27, which is adapted to slide in a yoke 28, and a spring 29, surrounding the rod 26, bears at one end on the head 27 and at the other end on the yoke. When the brakes are applied, the rods 25 will push against the heads on the ends of the rods 26 and cause the inertia device to turn on its pivot, and when the levers and pull-rods have reached the positions into which they would ordinarily be moved by the action of the air in the brake-cylinder the inertia device will continue its movement and exert a pull on the rods 26. The springs 29 will be compressed and will cause a pull on the rods 25 in proportion to the momentum of the inertia device, the pull on the rods 7 and 8 will be increased, and the brake-shoes will be applied with greater force than if the air-pressure in the brake-cylinder acted alone. The elasticity of the springs 29 will permit the weights 12 to move much farther than they would if they were connected with the levers or pull-rods by an unyielding connection, and it is this extended movement, due to the inertia of the weights, which effects the compression of the springs and the additional pull on the rods 7 and 8. It is desirable to retain the inertia device in position at the end of the movement in order to keep the springs 29 under compression and to continue the additional pull on the rods 7 and 8 while the brakes are applied, and for this purpose a pawl 17 is pivoted to the fixed part 15 and is connected by a rod 18 with a piston 19 in a small cylinder 20, which is at all times in open communication with the train-pipe 22 through a branch pipe 21. When pressure is reduced in the train-pipe, the spring 23 in the cylinder 20 moves the piston 19 so as to cause the pawl 17 to press on the edge of the part 14, and when the inertia device has turned through a sufficient angle in the direction indicated by the arrow marked $a$ in Fig. 5 the pawl will engage with the ratchet-teeth 24, formed on the edge of the part 14, so as to prevent return movement of the inertia device. The inertia device will remain locked until the train-pipe is recharged, when the piston 19 will be moved so as to disengage the pawl 17 from the ratchet-teeth 24, and all of the parts will return to their normal positions as the brakes are released. The brakes may be applied so gradually and the inertia device moved so slowly that there will be little or no compression of the springs 29 and no considerable movement of the weights 12 due to inertia. In such case it may not be desirable to lock the inertia device in place when the brakes are applied, and in order to prevent its being locked the teeth 24 may be so located that they will not be engaged by the pawl 17 unless the inertia device is turned through a considerable angle. In Fig. 5 of the drawings the piston 19 is shown in the position into which it is moved when the train-pipe pressure is reduced for applying the brakes, and the pawl 17 bears on the smooth portion of the edge of the part 14, so that the inertia device is not locked in position, but must be turned farther in the direction of the arrow before the pawl will engage with the ratchet-teeth.

In Fig. 6 of the drawings the inertia device or weight 30 is located within the brake-cylinder 6 and is normally in contact with the brake-cylinder piston, against which it is held by the pressure of the springs 31. The springs 31 surround the rods 32 and bear on the weight 30, and at their opposite ends they bear on washers or collars on the rods 32, and the rods 32 are secured to the brake-cylinder piston. A rack 33 is formed on an extension 34 of the weight, and a pawl 35 is adapted to engage with the teeth of the rack, so as to lock the weight in position when it is moved out in applying the brakes. The pawl is secured to and operated by the movement of a small piston 36 in the cylinder 37, the interior of which may communicate with the interior of the brake-cylinder 6 through the pipe 38, so that when the brakes are applied the pressure in the brake-cylinder will move the pawl so that it will engage with the teeth of the rack. When the brakes are applied with a considerable degree of suddenness, the inertia of the weight will tend to give it a greater travel than that of the piston, it will slide on the rods 32, the springs 33 will be compressed by the extended movement of the weight, and the weight will be locked in position at the end of its movement, so as to exert a pull on the piston acting in the same direction as the air in the brake-cylinder. When air is released from the brake-cylinder, the pawl 35 will be disengaged by the action of the spring 39 and the parts will be returned to their normal positions.

In the constructions shown in Figs. 7 and 8 the inertia device or weight 40 is mounted on an extension 41 of the brake-cylinder piston-rod. When the piston and rod are suddenly moved out by applying the brakes, the weight 40 will slide on the rod 41 and compress the spring 42, and air from the brake-cylinder will pass through pipe 48 and act on the small piston 43 in the cylinder 44, so as to move the pawl 45 into engagement with the teeth of the rack 47, which is formed on the weight.

In Figs. 9 and 10 two weights 48 are shown, each mounted on extensions 49 of the pull-rods 7 and 8. The arrangement of the weights and springs on the extensions 49 and the means for locking the weights in position are substantially the same as in the construction shown in Figs. 7 and 8. As there are two weights, two locking devices are required, and each of the small cylinders 50 is connected by a branch pipe 51 with a pipe 52, which communicates with the brake-cylinder.

In the modifications shown in Figs. 4 to 10 the means for locking the inertia device in position are not limited to the particular arrangement shown with each modification, as it is the intention merely to show that the pawl or locking device may be arranged so as to be operated in several ways.

I claim as my invention and desire to secure by Letters Patent—

1. In a railway-car brake apparatus, the combination with mechanism for applying the brakes and holding the same applied, of means for augmenting the force of the application by the action of inertia and additional means for maintaining the application of the augmenting force.

2. In a car-brake apparatus, mechanism for applying the brakes, means for holding the brakes applied, an inertia device operated by the brake-applying mechanism for augmenting the force with which the brake-shoes are applied and additional means for maintaining the continued application of the augmenting force.

3. In a car-brake apparatus, the combination, with mechanism for applying the brakes by the action of fluid-pressure, an inertia device for augmenting the force of the application, means for holding the brakes applied and additional means for maintaining the application of the augmenting force.

4. In a railway-car brake apparatus, the combination, with mechanism for applying the brakes, of means for augmenting the force of the application by the action of inertia and means separate from the brake-applying mechanism for maintaining the application of the additional force.

5. In a railway-car brake mechanism, the combination, with mechanism for applying the brakes, of an inertia device, for augmenting the force of the application, and means for locking the inertia device in position.

6. In a railway-car brake apparatus, the combination, with mechanism for applying the brakes, of an inertia device for augmenting the force of the application, and a yielding connection between the inertia device and the mechanism.

7. In a railway-car brake apparatus, the combination with mechanism for applying the brakes, of an inertia device for augmenting the force of the application, a yielding connection between the inertia device and the mechanism, and means for locking the inertia device in position when the brakes are applied.

8. The combination, in a brake mechanism, of a brake-actuating device and a yielding connection between the brake-actuating device and a part of the mechanism which is movable relatively thereto by the action of inertia.

9. The combination, in a brake mechanism, of a brake-actuating device, a yielding connection between the brake-actuating device and a part of the mechanism which is movable relatively thereto by the force of inertia, whereby the yielding connection may be subjected to strain by the force of inertia, and means for continuing the strain.

10. The combination, with a brake mechanism including means for applying the brakes, of an inertia device, a yielding connection between the mechanism and the inertia device, which is subject to strain by the action of inertia, and means for continuing the strain.

11. In a brake mechanism, the combination with a brake-actuating device, of an inertia weight adapted to be moved thereby, a spring connection between the inertia weight and a part of the brake-actuating device whereby the spring may be subjected to strain by the force of inertia and means for continuing the strain.

12. In a brake mechanism, the combination with a brake-actuating device, of an inertia weight adapted to be moved thereby, a spring connection between the inertia weight and a part of the brake-actuating device whereby the spring may be subjected to strain by the force of inertia and a pawl for maintaining the spring under strain.

13. In a brake mechanism, the combination with a fluid-pressure brake-actuating device, of an inertia weight adapted to be moved thereby, a spring connection between the inertia weight and a part of the brake-actuating device whereby the spring may be subjected to strain by the force of inertia, and means automatically operated by fluid-pressure for holding and releasing the strain of the spring.

14. In a brake apparatus, the combination with a brake-actuating device, of a pivoted arm carrying an inertia weight adapted to be moved thereby, a spring connection between the pivoted arm and a part of the brake-actuating device whereby the spring may be subjected to strain by the force of inertia and means for maintaining the spring under strain.

15. In a car brake apparatus, means for applying the brakes and additional means comprising an inertia device which is put in operation by the brake-applying means for augmenting the pressure with which the brake-shoes are applied.

In testimony whereof I have hereunto set my hand.

HENRY H. WESTINGHOUSE.

Witnesses:
L. E. LOVE,
J. SNOWDEN BELL.